A. H. HOOK.
Molds for Casting Stench-Traps.
No. 141,353. Patented July 29, 1873.
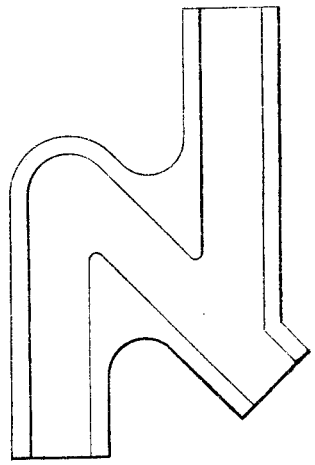
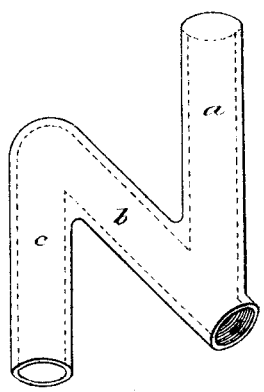
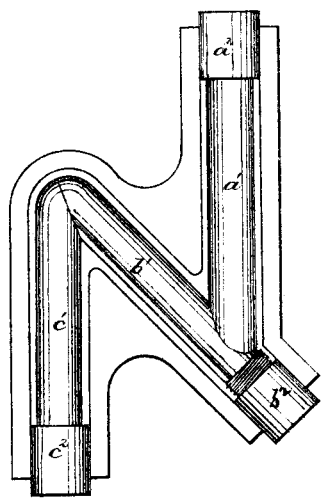
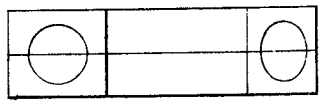
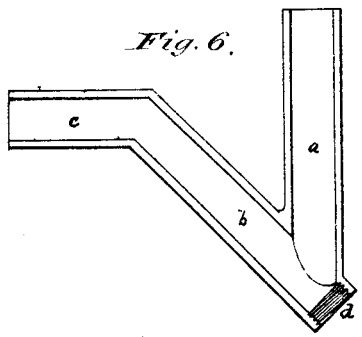
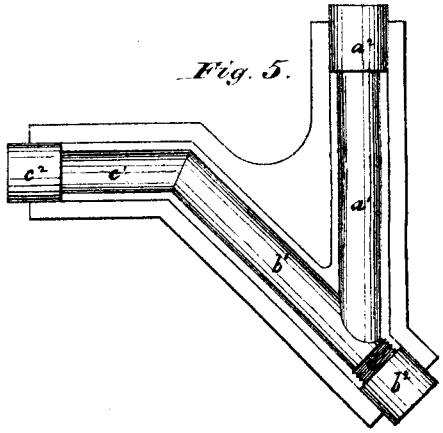
Witnesses:
J. H. Darlington
C. A. Brown
Inventor.
Albert H. Hook

UNITED STATES PATENT OFFICE.

ALBERT H. HOOK, OF NEW YORK, N. Y., ASSIGNOR TO CHAS. F. HERVÉ, C. C. TRACY, AND WM. A. SHAW, OF SAME PLACE.

IMPROVEMENT IN MOLDS FOR CASTING STENCH-TRAPS.

Specification forming part of Letters Patent No. 141,353, dated July 29, 1873; application filed April 18, 1873.

*To all whom it may concern:*

Be it known that I, ALBERT H. HOOK, of the city, county, and State of New York, have invented certain new and useful Improvements in Molds and Cores for Casting Lead or Composition S and Half-S Plumbers' Traps, of which the following is a specification:

My invention relates to that class of lead or composition plumbers' traps known as S and half-S traps. Its object is to facilitate the manufacture of traps of this kind, to form them in one piece or casting without the usual joints, which are so apt to give way and thus destroy the utility of the trap, and to accomplish this in a way that will allow the traps to be cast with facility and permit the removal of the core without trouble or danger of injuring the trap at its various bends. To accomplish this result I alter the form of the trap from that which heretofore has appeared, causing each branch to be straight or in a right line, and I employ a core which, while continuous throughout the length of the trap from end to end, is sectional, each section forming a continuation of the contiguous ones, the sections being placed end to end and fitting so closely together as to prevent the lead or composition from entering the joints. The molds and cores are made of metal, so as to be indestructible. The casting obtained in my mold will differ in shape somewhat from the ordinary shape of traps now in the market, but will be equally effective and practicable. The casting is made on three cylindrical metal cores, as will hereafter be explained.

Figure 1 is a face view of one-half of a mold to cast a trap which is intended to take the place of what is commonly called the S-trap, the three cores being removed; Fig. 2, a face view of the same, the three cores being inserted; Fig. 3, a bottom view of the two halves of the mold adjusted together without the cores; Fig. 4, an exterior view of the casting obtained from the mold shown in the previous figures; Fig. 5, a face view of one-half of a mold which will cast a trap intended to take the place of what is called the half-S trap, the three cores in place; Fig. 6, a sectional view of a trap cast in the mold shown in Fig. 5.

The S-trap (see Fig. 4) is of the shape of three straight cylinders, $a\ b\ c$, jointed together, $a$ and $c$ being parallel, and $b$ connecting $a$ and $c$ at an angle of forty-five degrees, more or less. Each of these cylinders is open at one end—$a$ at its upper end, $b$ and $c$ at their lower ends. The open end of cylinder $b$ is furnished inside with a female screw-thread, and can be closed by a screw-plug, (not shown in the drawings.) The cores $a^1\ b^1\ c^1$ are straight metal cylinders, of the size of the required bore of the trap, except at their outer ends $a^2\ b^2\ c^2$, where they are enlarged to the size of the exterior diameter of the trap, so as to fit the mold; thus the cores are held in proper position when the two halves of the mold are clamped together. The inner end of core $a^1$, where it meets the core $b^1$, is so fitted to the cylindrical shape of the core $b^1$ as to form a close joint without being fastened, and the inner ends of the cores $b^1$ and $c^1$ are also fitted together to a close joint, so as to permit no lead to enter these joints. The core $b^1$ is provided with a short male screw-thread, $d'$, close to the enlarged end $b^2$, which forms the female thread $d$ in the casting at the opening of cylinder $b$, said screw-threaded opening being designed to be closed by a screw-plug, which can be removed whenever it is desired to clear the trap.

The spout for pouring the lead into the mold may be at any convenient part, and is not shown in the drawings.

When the lead is poured the core $c^1$ is to be drawn, first, from the casting; next, core $b^1$ can be removed by turning or screwing, and, last, core $a^1$ can be withdrawn, when the trap is complete.

The mold and the cores for casting the half-S trap are substantially the same, and being clearly shown in Fig. 5 require no further description.

I am aware that an S-trap has before been cast in one solid casting. I am also aware that traps have been cast by the employment of sectional cores, each section being removed separately from the casting. I claim neither of these features, broadly.

What I do claim, and desire to secure by Letters Patent, is—

The herein-described apparatus for casting S and half-S lead or composition plumbers' traps in one piece, consisting of a metallic mold formed as described, in combination with a sectional metallic core, $a^1\ b^1\ c^1$, each section straight from end to end, the end sections joining the intermediate section at opposite ends thereof, and said intermediate section provided with a screw-thread, $d'$, said parts being fitted together and adapted for joint operation as herein shown and set forth.

ALBERT H. HOOK.

Witnesses:
J. H. DARLINGTON,
C. A. BROWN.